United States Patent [19]

Eckert

[11] Patent Number: 4,976,244
[45] Date of Patent: Dec. 11, 1990

[54] FUEL INJECTION DEVICE FOR INTERNAL COMBUSTION ENGINES, IN PARTICULAR UNIT FUEL INJECTION

[75] Inventor: Konrad Eckert, Stuttgart, Fed. Rep. of Germany

[73] Assignee: Robert Bosch GmbH, Stuttgart, Fed. Rep. of Germany

[21] Appl. No.: 424,459

[22] Filed: Oct. 20, 1989

[30] Foreign Application Priority Data

Dec. 31, 1988 [DE] Fed. Rep. of Germany ....... 3844475

[51] Int. Cl.⁵ ............................................. F02M 47/02
[52] U.S. Cl. .................................... 123/501; 123/447; 239/95
[58] Field of Search ............... 123/446, 447, 500, 501, 123/502, 467; 239/88, 89, 90, 91, 92, 93, 94, 95, 533.5

[56] References Cited

U.S. PATENT DOCUMENTS

| | | | |
|---|---|---|---|
| 4,235,374 | 11/1980 | Walter et al. | 239/90 |
| 4,250,857 | 2/1981 | Taplin | 239/533.5 |
| 4,281,792 | 8/1981 | Sisson et al. | 239/5 |
| 4,396,151 | 8/1983 | Kato | 239/90 |
| 4,409,939 | 10/1983 | Eheim | 123/447 |
| 4,427,152 | 1/1984 | Sisson | 239/90 |
| 4,463,725 | 8/1984 | Laufer | 123/446 |
| 4,467,963 | 8/1984 | Sisson | 239/95 |
| 4,471,740 | 9/1984 | Jourde | 123/446 |
| 4,475,514 | 10/1984 | List | 239/88 |
| 4,485,787 | 12/1984 | Kato et al. | 123/446 |
| 4,593,664 | 6/1986 | Omori | 123/446 |

FOREIGN PATENT DOCUMENTS 3700352 7/1988 Fed. Rep. of Germany .
0151262 11/1981 Japan ................................ 123/446

*Primary Examiner*—Carl Stuart Miller
*Attorney, Agent, or Firm*—Edwin E. Greigg

[57] ABSTRACT

A fuel injection device for internal combustion engines including a pump nozzle, a pump piston, preferably driven via a drive cam, and a pressure chamber disconnected from a pump chamber by an intermediate piston that preferably assumes its end positions in its working stroke, with a pressure line leading from the pressure chamber to an injection nozzle. The control of fuel quantity into the pressure chamber is effected via a control valve, preferably embodied as a magnetic valve, in a feed line that is also controlled by a control slide driven in synchronism with the pump piston. During one intake stroke segment of the pump piston, the feed line is connected to the pressure chamber; during another intake stroke segment, the feed pump is connected to a reservoir, so as to control the fill volume of the reservoir as a function of time. During the first compression stroke segment fuel is positively displaced from the pump chamber to the reservoir and once it is refilled with a variable fill quantity, the supply onset can be initiated by suitably driving the intermediate piston.

28 Claims, 3 Drawing Sheets

FUEL INJECTION DEVICE FOR INTERNAL COMBUSTION ENGINES, IN PARTICULAR UNIT FUEL INJECTION

BACKGROUND OF THE INVENTION

The invention is based on a fuel injection device for internal combustion engines, such as a unit fuel injector, as defined hereinafter.

With a fuel injection device of this kind, particularly if it is embodied as a unit fuel injector, a greater degree of freedom in terms of open- and closed-loop control actions in the overall injection process is attained than is possible with conventional injection devices, while maintaining high fuel metering quality. In conventional fuel injection devices, the fuel quantity and injection onset are controlled by edges of the pump piston, with the aid of mechanical or hydraulic speed governors. Moreover, without disadvantage to these open and closed-loop control actions, it is possible with these unit fuel injectors to operate at a higher injection pressure, which is necessary in some high-speed direct-injection engines, because the camshaft of the engine is usually used directly to drive the pump piston. By thus using existing drive mechanisms, the cost and drive losses are furthermore reduced.

An essential feature of these unit fuel injectors is the use of an intermediate piston, which separates a pressure chamber from a pump chamber; these terms are largely arbitrarily selected, because naturally both chambers are high-pressure pumping chambers. The term pump chamber has been selected because this chamber is immediately adjacent to the pump piston, and the term pressure chamber has been selected for the other chamber because the injection cannot begin until a suitable pressure is attained in that chamber. While the volume remaining in the pump chamber when the high pressure for the injection is set serves to determine the injection onset, the fuel volume present at that moment in the pressure chamber is used for injection. By using this kind of intermediate piston, a clear separation between the open and closed-loop control actions for controlling the injection onset or the injection quantity is attainable without entailing considerable additional expense; by intermingling the functions, the tasks of a fuel injection pump and the tasks of a hydraulic governor are attained in one unit. A great number of known unit fuel injectors of this kind, operating with an intermediate piston, are known, as well as a number of corresponding unit fuel injectors not having a later priority date. Depending on the type of control, the intermediate piston may be coupled to the pump piston, leaving a certain free stroke; its stroke can be determined by stops; it may be urged by springs either in the direction of the pump piston or away from it; and it can be used to control hydraulic flows, or in other words arbitrary conduits that discharge into the pump cylinder. However, it is always the same diameter as the pump piston.

The cam used to drive the pump piston and thus the intermediate piston of the unit fuel injector is usually disposed on the engine camshaft, so that the drive and the associated control processes are effected as a function of the rotational angle, and the resultant control times are directly rpm-dependent. The drive path of the cam is divided into three segments: a steep compression stroke segment (compression stroke edge or curve), an ensuing, slowly descending intake stroke segment (drop edge or curve), and if desired for control, a resting segment (base circle of the cam), which then merges again with the compression stroke segment. The compression stroke segment of the cam path is relatively short and steep, to attain the desired injection effect, which requires a rapid pumping motion of the pump piston and hence of the intermediate piston. The intake stroke segment, contrarily, is embodied relatively flat, so that in combination with the resting segment as much control time is available as possible for metering fuel in the two chambers, because in these unit fuel injectors the fuel metering is also effected by timing control, namely by opening or closing a fuel line by means of the control valve.

Aside from the rotational-angle-dependent control effected with the joint action of the control edges of the pump piston and intermediate piston, and the time-dependent control determined by the control valve, various valves preventing a reverse flow are also involved in the control; of these, the following description will refer only to check valves, although such valves may also include those having no valve seat, for instance being embodied as slide valves.

The actual problems in such control are much greater than can be described here, because of the parasitic oscillations that occur in such systems and can hardly be controlled. Such parasitic oscillations are produced on the one hand at the control valve and on the other even with mechanical pump piston drive, because in the latter case although there is a constant amplitude, the frequency is dependent on the rpm; that is, the parasitic oscillations are of high frequency if the actual compression stroke at high rpm is very brief. The parasitic oscillations can thus be distinguished by their phase relation from the oscillation resulting from the injection. Although such parasitic oscillations that are ascribable to the mechanical drive are virtually uncontrollable, nevertheless a quantitative estimate of their effect on the range of variation in the fuel quantity can be made. In simplified terms, it can be assumed that with control-edge control, the control quantity remains unaffected by the parasitic oscillation. The situation is different with fuel quantity control by means of a time-controlled valve, in which the critical parasitic frequency is very high, and at a constant amplitude can cause an error in fuel quantity of several percent, and this error is not readily controllable. On the other hand, the advantages of such a control valve, especially when it is a magnetic valve that is triggered by an electronic control unit, are indispensible to meet technical open- and closed-loop control requirements. Naturally this is true not only for a magnetic valve but for any corresponding electrically controlled device.

In a known unit fuel injector (U.S. Pat. No. 4,235,347) of this generic type, the supply quantity and supply onset are determined by the opening and closing of a magnetic valve disposed in the metering line to the pump chamber; a filling line unaffected by the magnetic valve and in which a check valve is disposed leads to the pressure chamber of the unit fuel injector. During a first intake stroke section of the pump piston, the magnetic valve remains closed, so that with the now-closed pump chamber the intermediate piston is pulled along as well, as a result of which fuel at low pressure flows via the fill line and the check valve into the pressure chamber. The force of a spring engaging the intermediate piston in the direction of the pressure chamber is overcome in this process as well; in other words, the low pressure downstream of the check valve, or in other words in the pressure chamber must likewise be sufficiently high to overcome the spring force. Once the supply quantity desired for the injection has been metered, the feed line leading to the pump chamber is opened via the magnetic valve, so that during the continuing intake stroke, this fuel at low pressure now flows into the pump chamber and acts upon the intermediate piston on the side of the spring, causing this piston to remain in its position.

In this known unit fuel injector, the magnetic valve then remains opened until the beginning of the subsequent compression stroke, and during the remainder of the intake stroke fuel flows into the pump chamber and continuously fills it. During the resting section of the cam path as well, the magnetic valve remains opened, and then closes only after the beginning of the compression stroke and at a desired instant of injection onset. From this closing instant of the magnetic valve on, the fuel enclosed in the pump chamber effects a drive of the intermediate piston and thus a feeding of fuel out of the pressure chamber to the nozzle.

The control of quantity for the pressure chamber and the pump chamber, that is, the control of the injection quantity and the quantity determining the instant of supply onset, thus takes place in a time-controlled manner via the magnetic valve, and a control process thereof is effected during the pressure stroke, namely in order to initiate the high pressure. While fault deviations of the magnetic valve are less critical during the intake stroke, during the compression stroke they can cause errors in fuel quantity of up to 30%. In either case, this kind of determination of fuel quantity is too imprecise, and besides the above-mentioned control errors, any other possible influences must also be taken into account, such as leaks in lines and valves, changes in flow conditions for instance caused by opening forces of the check valves, and varying temperatures of the fuel or a varying fuel pressure of the feed pump.

A further disadvantage of this purely time-controlled, known unit fuel injector is that especially at relatively high rpm the mass inertia of the intermediate piston and also throttling effects in the feed line and fill line have a disadvantageous effect. A very precise adaptation must for instance be made between the throttling effect of the magnetic valve to the pump chamber and that of the check valve to the pressure chamber, in combination with the work faces of the intermediate piston, the fuel pressure, and the force of the spring urging the intermediate piston toward the pressure chamber Since the dynamic force of the massive intermediate piston varies in accordance with rpm, and this intermediate piston must be stopped for determining the injection quantity by relatively slight forces during its intake stroke, the result is extraordinarily complex function equations, so that it is virtually impossible to provide a theoretical predetermination in this system; instead, the system must be adapted empirically to each engine, and as is well known each engine, even in the same production run, has a different oscillation pattern.

Although the continuous filling of the pump chamber and pressure chamber advantageously suppresses cavitation, the closure of the inflow line to the pump chamber during the pressure stroke, for the reasons given above, causes deviations from the desired set-point injection time, which is particularly disadvantageous if the instant of injection must be adjusted extremely far away from any parameters. This occurs particularly if the load-dependent injection timing adjustment and the rpm-dependent injection timing adjustment are both in the same adjusting direction. To enable this magnetic valve in the known unit fuel injector to withstand the high pressure, it must be suitably embodied. Although there is as yet no injection pressure in the return feeding, this return feed pressure, which is much higher than the feed pump pressure, varies as a function of rpm within certain limits, which likewise has an influence on the closing process, and certainly on the return feeding process, with a tendency to delay the onset of supply toward "late". However, since the magnetic valve must also be designed for the injection pressure, in other words a maximum possible fuel pressure, which is about 100 times higher than the feed pump pressure, not only the production cost but also the current consumption during operation are correspondingly high.

In addition, in terms of purely time-dependent control of the supply quantity, it should be noted that the supply quantities between idling and full load vary at least at a ratio of 1:15, but also up to 1:30, in each case between the lowermost rpm and the maximum rpm, so that a corresponding effect of the throttling action on the fuel quantity control is unavoidable, and this is always associated with quantity control errors. Naturally the throttling action at the check valve at the entry to the pressure chamber, in this known unit fuel injector, is very much less at the lowest rpm and with an idling quantity than at full load quantity and maximum rpm, in which 30 times the quantity, for example, must be pumped through the same cross section in 1/30 the time.

Taking these conditions into account, it is already known (from German Offenlegungsschrift No. 37 00 352), in a fuel injection device and in particular a unit fuel injector of the type described initially to control the feed line, controlled by the control valve, by the pump piston as well, and during a first intake stroke segment of the pump piston to disconnect this feed line from the stroke chamber and connect it with the fill line of the pressure chamber, and during a later segment of the intake stroke, that is, in the resting segment of the intake stroke and in the resting segment of the cam driving the pump piston to re-connect this feed line to the pump chamber, after previously disconnecting it from the fill line. With this combination in terms of quantity control in the pump chamber and in the pressure chamber of angle-dependent control-edge control and time-dependent magnet-valve control, the above-discussed quantity control errors can be cut in half, and the initiation or end of quantity control is defined by a control-edge control. In this way, with acceptable variation of the set-point metering quantity, the use of an electronic control unit, namely to trigger the magnetic valve, is possible, as a result of which an optimization of the injection to engine parameters is attainable in the simplest way. Naturally, instead of a magnetic valve, a valve controlled in some other way may be used.

A particular advantage of that system is that the quantity metering, determining the supply onset and the supply quantity, is done during the intake stroke, or in other words on the return cam edge, and for this purpose this return edge including the resting segment is enlarged, with a corresponding decrease in size of the compression stroke edge. The compression stroke edge now serves merely to provide pure high-pressure injection, and therefore advantageously be embodied very steeply, which is advantageous above all for the course of injection. Since no quantity control now takes place on the high-pressure side, the course of injection can be varied arbitrarily. In accordance with the steep injection course, the rotational angle of the cam used for injection is also relatively small, which favors the rotational angle that is available for the trailing edge or pitch circle of the cam; the drop edge can be made five to seven times flatter than the compression stroke edge of the cam. In accordance with the available rotational angle, more time is correspondingly available for the intake stroke segment and the resting segment, which is particularly advantageous at high rpm. Because of the longer metering time that is available, the critical disturbance frequencies are also lower. It is also possible for the disturbance frequency to approach the vicinity of the injection frequency, which predominantly determines the phase relation and amplitude of an adjacent disturbance frequency. By means of this longer available control time, the variation in the fuel quantity to be controlled, dictated by the magnetic valve, is also less. Because of the available time, the control of the quantity that determines the supply quantity and the supply onset can be done without difficulty with only one magnetic valve. A particular advantage is that the magnetic valve operates only in the low-pressure range, and can be correspondingly simply embodied, despite high switching frequencies.

In this known unit fuel injector, the reversal of the fuel feed line from the pressure chamber to the pump chamber and back again is effected via the pump piston, or a control slide driven in synchronism with the pump piston, so that the beginning and end of metering is connected as a function of rpm. Thus, at the beginning of the intake stroke the control valve is closed, and it opens to initiate feed quantity metering into the pressure chamber, and because of the suction effect of the pump piston, the intermediate piston already executes the necessary stroke. The larger the supply quantity is to be, the earlier the magnet valve opens. In each case, feeding into the pressure chamber is interrupted whenever the pump piston blocks the feed line. The control valve also continues to be open as long as the pump piston keeps the feed line closed, and then upon reopening, the feed line connecting it to the pump chamber by cooperation with the resting segment of the cam, the pump piston assumes its dead center position. The fuel flowing through the control valve (magnetic valve) is accordingly pumped into a void, and the supply onset begins later, the earlier the control valve closes. The intermediate piston itself assumes a floating position in accordance with the negative pressure, which makes it more difficult to control not only the disturbing oscillation but also the magnet-dictated errors in fuel quantity, because mass acceleration forces of the intermediate piston can have an effect on the metering taking place at low pressure.

It has been set forth heretofore in an application Ser. No. 340,210, filed Apr. 19, 1989 in the U.S. Patent and Trademark Office, (German Patent Application No. P 38 23 827.6) to provide an adjusting spring, acting in the direction of the pump chamber, on the intermediate piston, and to provide a stop, determining the outset position before the onset of the compression stroke, for the intermediate piston, so that this intermediate piston will in each case attain its stop during the drop edge of the cam. As a result, above all the peripheral conditions relating to vibration are the same in each cycle. The control valve can open and close again during the supply quantity metering segment, or combined with the rpm-dependent edge control of the pump piston it can determine the onset time or end time of this metering. The remaining voids in the pressure chamber and pump chamber are thus suitably divided up in accordance with the instance of supply and in accordance with the injection quantity. This clear division of the metering segments permits improved monitoring in quantity control, above all of the hydraulic connections, and thus of the disturbance vibration causing the variations. The supply from the feed line takes place in each case in a pressure chamber that is always the same for each cycle, so that the same basic conditions always prevail for metering of the injection quantity.

While a change in the injection quantity is expressed as an rpm variation with the engine load remaining the same, this particular actual rpm is corrected in the direction of the set-point rpm as dictated by the governor, so that taken all in all, variations and errors in the injection quantity control, considered deductively, are eliminated, and so the void remaining as a result of the partial filling of the pressure chamber has virtually no disadvantageous effect.

The situation is different with quantity control into the pump chamber, which determines the supply onset. Errors in the supply onset have an effect on both fuel preparation and fuel combustion, and hence on the noise and exhaust gases produced by the engine. The supply onset must additionally be controlled not only as a function of rpm but also as a function of load, which results in quite complicated governing, and any existing void can be disadvantageous in that case.

With the known unit fuel injector described at the outset above, a void of this kind is avoided by shifting the control of the supply onset into the compression stroke phase, with all the attendant disadvantages thereof.

OBJECT AND SUMMARY OF THE INVENTION

The fuel injection device according to the invention has an advantage over the prior art that while maintaining the above-described advantageous halving of the errors occuring in fuel metering, for example by dividing it into angle-dependent and time-dependent control of the quantities to be metered, the advantage of the fuel injection system described first above is attained, so that no void exists in the pump chamber prior to the onset of the compression stroke. This advantage is attained without the above-described considerable disadvantages existing in this known fuel injection system, and using the reservoir or deflection piston known per se, which in the manner described here is not very expensive and enables extremely exact determination of the supply onset. At no point in the operation are ragged connections made between the chambers and conduits involved. Since the fuel metering is effected during the intake stroke, the actual course of injection, such as the injection duration, can be varied without causing variation of the injection quantity.

The control of the volumetric capacity of the reservoir can be done in various ways. The reservoir piston itself may be embodied in the manner of a deflection piston or a metering piston, in each case having the function at the onset of the compression stroke of the pump piston of receiving a quantity of fuel from the pump chamber, so that only after that can the resting pressure required for injection be established in the pump chamber, as a consequence of the remaining enclosed volume of fuel. The compensation line present between the pump chamber and the reservoir chamber must thus be opened at least during the first compression stroke segment, to enable an overflow of fuel out of the pump chamber to the reservoir chamber. In principle, however, the volumetric capacity of the reservoir may be determined only by the stroke of the reservoir piston, which in turn may be controlled in various ways.

In an advantageous feature of the invention, the control of the volumetric capacity of the reservoir chamber is determined for the supply onset via the control valve and the feed line. As a result, the same control valve that determines the injection quantity is also used for determining the stroke of the reservoir piston, because sufficient time is available during the intake stroke. This can again be done in various ways, for instance by adjusting a stop that determines the stroke of the reservoir piston.

In a further advantageous feature of the invention, the feed line is additionally controllable by a control slide driven in synchronism with the pump piston. This kind of provision can already be found in the generic fuel injection device, in which the pump piston serves as this kind of control slide. In that case, the pump piston connects the feed line to the pressure chamber during the first segment; after that, the feed line is blocked by the pump piston, and then shortly before the end of the intake stroke a connection of the feed line to the pump chamber is made. Because of the intake-stroke-dictated negative pressure established in the pump chamber in the mean time, fuel now flows out of the feed line into the pump chamber, until the control valve blocks fuel flow after attaining the quantity determining the supply onset. Then as soon as the compression stroke has begin, the feed line is again blocked by the pump piston, so that the adequate high pressure can be established in the pump chamber. In other words, it is a precondition of this known means of control that a hollow space is formed in the pump chamber, in which the quantity determining the supply onset is metered. This kind of temporary blockage of the feed line is unnecessary with the control piston according to the invention; on the contrary, a control of the volumetric capacity of the reservoir can be done simultaneously with fuel metering into the pressure chamber, because it is a combined time/angle control that is used here, for instance the feed line at the onset of the intake stroke is connected to both the pressure chamber and the reservoir, and once a predetermined intake stroke of the control piston has been executed the connection with the reservoir is blocked, so that metering into the pressure chamber is not ended until the closure of the control valve.

However, a preferred feature of the invention provides that in the intake stroke of the pump piston, the control of the fuel volumes into the pressure chamber is done first, and after that the control of the volumetric capacity. As a result, any ragged connection between the chambers involved is avoided. Additionally, the control range of the supply onset is expanded, and the injection onset is optimized as a function of load and/or rpm.

It is particularly advantageous if the functional course according to the invention is such that the feed line is opened by the control valve and control piston at the onset of the intake stroke and closes again after metering of the injection quantity, after which, in the further intake stroke the control piston disconnects the feed line from the pressure chamber and connects it to the reservoir, so that the control valve subsequently opens, and then re-closes in a quantity-determining manner for the supply onset. Since the quantity to be metered is always dependent on the cross section through which there is a flow at a predetermined pressure and per unit of time, this clear chronological separation of the metering into various chambers prevents unpredictable and poorly controllable influences of various throttling effects.

In a further advantageous embodiment of the invention, in a manner already proposed, the end positions of the intermediate piston are determined by stops. The intermediate piston attains its particular end position accordingly in each operating cycle. As a result, the same outset position of the intermediate piston is attained advantageously prior to each intake stroke and prior to each compression stroke, and thus a clear association of the particular operating position of the intermediate piston with respect to the operating positions of the pump piston and drive cam is also attained. Thus, the association with a definable cam path is attained for the intermediate piston prior to each intake stroke. This is important to obtain a clear association between angle control and timing control, which in governing must be coupled to one another.

In a further advantageous feature of the invention, the intermediate piston is loaded with a spring acting in the pump chamber direction. By means of this spring, it is assured, primarily as a result of the void forming in the pressure chamber during the intake stroke, that the compression stroke outset position of the intermediate piston is always the same, and the void can in no way affect quantity control in the pump chamber.

In another advantageous feature of the invention, in the intake stroke end position of the pump piston the pump chamber is connected via a fill line to a low-pressure fuel source. This prevents the formation of a void in the pump chamber after the end of the intake stroke, so that the quantity to be received by the reservoir is in fact equivalent to the displacement quantity of the pump piston during the first segment of the compression stroke.

In another advantageous feature of the invention, the reservoir piston functions as a deflection piston, which at the beginning of the compression stroke, while receiving fuel from the pump chamber, is deflected by a controllable stroke. As a result, a volume of fuel is present which is enclosed in the pump chamber and reservoir chamber after the onset of the compression stroke, and which is displaced toward the reservoir chamber, until the deflection piston strikes a stop. Already in this phase, the intermediate piston can also be displaced in order to compensate for the void in the pressure chamber. In any case, any parasitic influnces of control functions are suppressed.

In a further advantageous feature of the invention, the reservoir piston is urged in the deflection direction by a reservoir spring, and the side of the deflection piston remote from the reservoir chamber can be acted upon via a control line by fluid pressure that is higher than the pressure prevailing in the pump chamber during the intake and resting phase of the pump piston and is sufficient to overcome the reservoir spring force, and by way of this pressure the reservoir piston is displaceable by a distance equivalent to the deflection stroke. The deflection piston is accordingly put by the control pressure during the intake stroke of the pump piston into a position from which the deflection stroke begins during the compression stroke, and the possible remaining travel of the deflection piston in each case is equivalent to its useful stroke. Advantageously, such a deflection stroke is easily controllable via a timing control of the control line during the intake stroke. By means of the reservoir spring, it is attained that despite a possible suction action from the pump chamber, the reservoir piston will maintain a defined position. As a result, an additional adjustable stop, which could be the source of control errors, can be dispensed with.

In a further advantageous feature of the invention, the control line can be connected to the feed line by the control piston. The feed line itself is controlled by the control valve and serves as the fuel line for the low-pressure fuel source. In this way, via the control piston, the fuel flow from the low-pressure fuel source is carried directly to the back side of the deflection piston, either parallel to or alternative to the supply to the pressure chamber. Advantageously, the control valve is always part of the closed-loop control circuit for the injection quantity and injection onset.

In a further advantageous feature of the invention, the pump piston serves as a control piston. As discussed above, it is known per se via the pump piston to connect the feed line to the pump chamber or the pressure chamber, but not contrarily for controlling the volumetric capacity of a reservoir. The advantages, namely the exact, angle-dependent control of conduits, are nevertheless the same as in the known injection devices.

In an alternative advantageous feature of the invention, the intermediate piston serves as a control piston. The required switchover accuracy is attained above all if the intermediate piston in the first portion of the intake stroke is displaced in synchronism with the pump piston.

In a further advantageous feature of the invention, the control valve is embodied in the closing position as a check valve through which the flow can be in counter current, so that during the first compression stroke phase of the pump piston, fuel can be positively displaced from the reservoir back to the fuel source, via the control line and the feed line as well as the control valve. Naturally it would also be possible to allow this quantity, pre-stored in the deflection piston at the onset of the compression stroke, to flow out via an outflow valve at sufficient opening pressure, although in that case this opening pressure would have to be substantially higher than the control pressure coming from the feed line. This kind of increased opening pressure would not be disadvantageous, however, because during the compression stroke pressures on the order of 100 times the low pressure are used in any case. However, an extra line and an extra valve would both be necessary. In a further advantageous feature of the invention, again known per se, a magnetic valve that is preferably open when without current is used as the control valve, and is triggered by an electronic control unit in which engine parameters such as rpm, temperature and the like are processed. The magnetic valve can be inserted into the pump housing in such a way that the distance between the control point in the magnetic valve and the control point on the pump piston or intermediate piston is minimized. This accordingly minimizes that segment of the feed line. By this decrease in the cylinder clearance, its influence on the control is also eliminated. Naturally instead of a magnetic valve some other kind, in particular an electrically actuated control valve, may be used, which preferably never needs to control more than a low fuel pressure.

In another advantageous feature of the invention, the drive of the pump piston is attained by a drive cam, which have a long, flatly descending intake stroke segment (intake stroke edge III), a short resting segment (base circle IV) and a steep compression stroke segment (compression stroke edge V). The curve of the intake stroke edge preferably follows an Archimedes spiral; that is, it becomes flatter and flatter toward the end. With the above-given features, it is possible to keep the intake stroke edge portion of the total rotational angle of the cam quite high, in order to obtain an optimum of control time and rotation angle per intake stroke, which is definitive for the quality of fuel metering.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
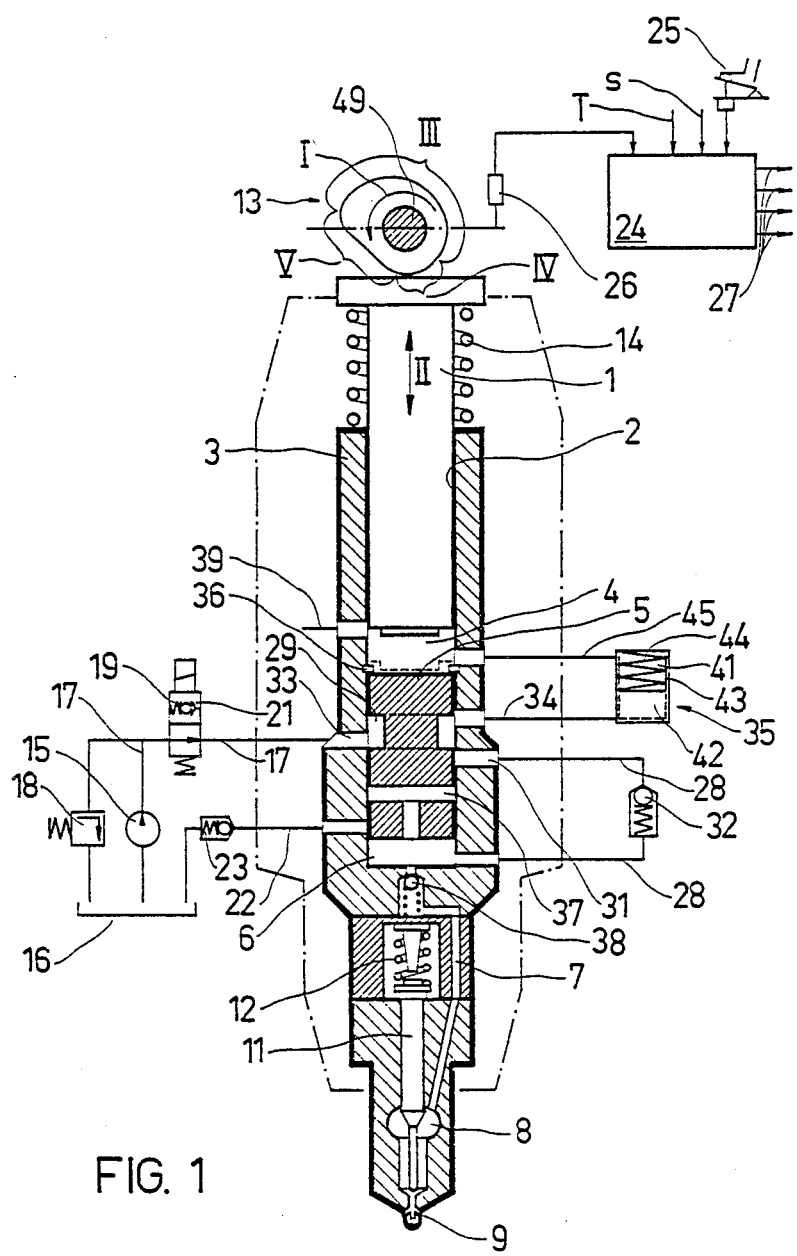
FIG. 1 shows the first exemplary embodiment in the form of a highly simplified injection system having a unit fuel injector, seen in longitudinal section.

In the injection device shown in FIG. 1, a pump piston 1 moves in a cylinder bore 2 of a housing 3 and defines a pump chamber 4, which is defined on the other end by an intermediate piston 5, which likewise moves axially displaceably in the same cylinder bore 2. On the side remote from the pump chamber 4, the intermediate piston 5 defines a pressure chamber 6, which communicates via a pressure conduit 7 with a nozzle pressure chamber 8, from which injection openings 9 branch off. The injection openings 9 are controlled by a valve needle 11, which is urged in the closing direction by a closing spring 12.

The pump piston 1 is driven by a drive cam 13, rotating in the direction of the arrow I, counter to the force of a restoring spring 14 to provide its reciprocating pumping motion represented by the double arrow II. The drop path of the cam is divided into three segments: a relatively long intake stroke segment III (intake stroke edge), a short resting segment IV (base circle of the cam), and a steep compression stroke segment V (compression stroke edge). In the drawing, the base circle of the cam IV is at this time acting upon the pump piston 1, shortly before the compression stroke edge V comes into play; that is, as the cam 13 continues to rotate, the pump piston will begin its begin its downward compression stroke. The pump piston 1 accordingly assumes its top dead center position in accordance with an end position after the intake stroke, and an outset position before the compression stroke.

The fuel injection device described here includes not only the unit fuel injector but also a low-pressure fuel system having a feed pump 15, which aspirates the fuel from a container 16 and pumps it via a feed line 17 to the unit fuel injector, and a pressure maintenance valve 18 is disposed in a line that branches off and leads back to the fuel container 16. As a control valve, a 2/2-way magnetic valve 19 is disposed in the feed line 17, to enable timely control of the fuel flow to the unit fuel injector. This magnetic valve 19 is open when it is without current. A one-way check valve 21 is disposed in the magnetic valve 19, and in the closing position of the magnet valve it blocks the feed line 17 in the direction toward the unit fuel downward compression stroke. The pump piston 1 injector, but permits flow in the opposite direction toward the feed pump.

Branching off from the cylinder bore 2 of the unit fuel injector is a diversion conduit 22, which is opened by the intermediate piston 5 toward the end of the compression stroke and as a result relieves the pressure in the pressure chamber 6. The diversion conduit 22 discharges into the fuel container of the low-pressure fuel system, and a one-way check valve 23 disposed in the diversion conduit 22 prevents an uncontrolled inflow of fuel from the low-pressure system to the pressure chamber 6.

The magnetic valve 19 is triggered by an electronic control unit 24 via one of the output lines 27, in order to regulate or control the opening and closing time or opening times of the magnetic valve 19, the engine rpm or power, and the injection onset. The load is fed into this electronic control unit 24 via a gas pedal 25, and the rpm n is fed to it via an rpm transducer 26; at least two additional transducers, not shown, feed it the temperature T and a further signal S, for example relating to the exhaust gas or the ambient air pressure. Additional outputs 27 of this electronic control unit 24, four of which are shown to correspond to a four-cylinder engine, each lead to a magnetic valve 19 of one unit fuel injector, of which again four are present, although they are supplied in common by only a single feed pump 15 or from one fuel container 16. The unit fuel injector has a fill line 28, which via an annular groove 29 disposed in the jacket face of the intermediate piston 5 can be connected to the feed line 17, and discharges into the pressure chamber. In FIG. 1, this annular groove 29 has just been disconnected from the entry portion 31 of the fill line 28. A fill valve 32 operating as a one-way check valve is disposed in the fill line 28.

The location of a mouth 33 of the feed line 17 in the cylinder bore 2 is selected such that it is always in coincidence with the annular groove 29 of the intermediate piston 5 and by way of it communicates with the pressure chamber 6 during the first intake stroke segment via line 28 and one-way check valve 32. Once the intermediate piston 5 in the intake stroke is displaced into the position shown in FIG. 1, the mouth 33 communicates via the annular groove 29 with a control line 34; this occurs at the latest whenever the resting segment IV of the cam 13 cooperates with the pump piston 1, or in other words when the pump piston 1 assumes its intake stroke end position or compression stroke starting position. The control line 34 leads to a hydraulic reservoir 35, which in the control position shown thus communicates with the feed pump 15 by means of the magnetic valve 19.

The stroke of the intermediate piston 5 in the intake stroke direction is defined by a stop 36, against which the intermediate piston 5 strikes upon each cycle after a predetermined intake stroke segment of the pump piston 1. For controlling the diversion conduit 22, a transverse diversion bore 37 is provided, extending in the intermediate piston 5 and discharging into the pressure chamber 6 via an axial bore; toward the end of the compression stroke of the pump piston 1, this diversion bore comes to coincide with the diversion conduit 22, as a result of which the fuel feeding from the pressure chamber 6 to the injection nozzle is interrupted. Between the pressure chamber 6 and the injection nozzle or nozzle pressure chamber 8, there is a pressure valve 38, which as a one-way check valve prevents the fuel, when the valve needle 11 closes, from flowing back out of the nozzle pressure chamber 8 via the pressure conduit 7 into the pressure chamber 6.

In the intake stroke end position of the pump piston 1 shown in FIG. 1, its lower edge opens a refill line 39, which communicates with a low-pressure fuel source, the pressure of which is lower than that of the feed pump 15, so that any void that might be created during the intake stroke can be refilled with fuel at the end of the intake stroke.

The hydraulic reservoir 35 has a reservoir chamber 41 and a control chamber 42, which are separated from one another by an axially displaceable, radially sealing reservoir piston 43. The reservoir piston 43 is loaded by a reservoir spring 44, which acts in the direction of the control chamber 42. The reservoir spring 44 is disposed in the reservoir chamber 41. The reservoir chamber 41 communicates continuously with the pump chamber 4 by means of a compensation line 45.

The function of this first exemplary embodiment will be briefly described below, and the problems the injection device according to the invention is intended to address will become apparent from the second exemplary embodiment and the diagrams given in FIGS. 5 and 6.

In the exemplary embodiment shown in FIG. 1, the pump piston 1 assumes its top dead center position, that is, the intake stroke end position or compression stroke outset position. If the drive cam 13 is rotated onward in the direction represented by the arrow I, the compression stroke edge V comes into play, and the pump piston 1 is displaced downward in an accelerated fashion in the direction of the arrow II. After it has covered a pre-stroke, it blocks the refill line 39. As the compression stroke continues, fuel is positively displaced out of the fuel-filled pump chamber 4 via the compensation line 45 into the reservoir chamber 41, with the reservoir piston 43 being displaced downward, reinforced by the reservoir spring 44. The fuel located in the control chamber 42 is positively displaced via the control line 34, the annular groove 29 in the intermediate piston 5 and the feed line 17, and also via the pressure maintenance valve 19, into the fuel container 16. The magnetic valve 19 assumes its closing position at this time, so that this fuel flows via the check valve 21. This process continues until such time as the reservoir piston 43 attains its end position in the hydraulic reservoir 35.

As the compression stroke of the pump piston 1 continues, the intermediate piston 5 is displaced in the direction of the pressure chamber 6 because of the unyielding volume of fuel enclosed in the pump chamber 4, and any void that might be located in the pressure chamber 6 is compensated for. Now that the pressure chamber 6 is also reduced to the fuel volume located there, an increasing pressure builds up there that is transmitted to the nozzle pressure chamber 8 via the pressure valve 38 and the pressure conduit 7, until the valve needle 11 is displaced in the opening direction, counter to the force of the closing spring 12, and uncovers the injection openings 9 for the injection of the fuel into the engine. The annular groove 29 of the intermediate piston 5 is also disconnected from the control line 34 in this process and connected to the entry position of the fill line 28, although this has no effect on the fuel pressure in the pressure chamber 6, because a hydraulic decoupling is provided by means of the fill valve 32.

Toward the end of the compression stroke of the pump piston 1, or in other words shortly before the end of the effect of the compression stroke edge V of the drive cam 13, the diversion conduit 22 is opened by the diversion bore 37, so that the remaining fuel positively displaced into the pressure chamber 6 flows via this diversion bore 37 and the diversion conduit 22 and via the check valve 23 into the fuel container 16. At the same time, because of the decrease in pressure, the valve needle 11 and the pressure valve 38 close, which dictates the end of injection.

Upon further rotation of the drive cam 13, the drop edge III comes into play, in combination with the restoring spring 14 of the pump piston 1, for the intake stroke of the pump piston. At the onset of the intake stroke, the magnet valve 19 assumes the position shown in FIG. 1, in other words the electrically excited state, so that fuel from the feed pump 15 flows into the pressure chamber 6 via the feed line 17, the magnetic valve 19, the annular groove 29, the fill line 28 and the fill valve 32. As a result, the intermediate piston 5 is displaced upward in synchronism with the pump piston 1 likewise actuated upward in the direction of the arrow II. Although there is communication between the pressure chamber 6 and the diversion conduit 22 through the diversion bore 37 in the bottom dead center position of the intermediate piston, no fuel flows out as a result, because the closing force of the check valve 23 is designed to be sufficiently high. Naturally, the diversion conduit can instead discharge into the feed line 17, preferably upstream of the magnetic valve 19, so that the delivery pressure into the pressure chamber 6 is reduced by the fill valve 32 to such an extent that the fill pressure finally established in the pressure chamber 6 is lower than the feed pressure in the feed line 17, which further reinforces the closing force of the check valve 23. As soon as the fuel quantity to be injected into the engine from the pressure chamber 6 in the next pumping cycle has flowed into the pressure chamber 6, the magnetic valve 19 is excited and blocks the feed line 17.

Since the pump piston 1, driven by the restoring spring 14, continues its intake stroke, the intermediate piston 5 is displaced onward as well, so that via the annular groove 29, if this has not already occurred, it connects the feed line 17 to the control line 34. As soon as the magnetic valve 19 is then electrically switched off again, it assumes the position shown in FIG. 1, so that fuel flows out of the feed line 17 via the annular groove 29 and the control line 34 into the control chamber 42 of the reservoir 35, in the course of which the reservoir piston 43 is displaced counter to the force of the reservoir spring 44. The fuel positively displaced out of the reservoir chamber as a result flows via the compensation line 45 into the pump chamber 4, which is enlarging continuously because of the intake stroke. The resultant negative pressure reinforces the overpressure prevailing in the control chamber 42. As soon as a desired reservoir volume is attained in the reservoir—which in turn, as the displacement volume, determines the injection onset during the compression stroke—the magnetic valve 19 is excited and blocks the delivery of fuel to the reservoir, so that the reservoir piston 43 remains in whatever position it occupies. An enclosed volume is thus present between the magnetic valve 19 and the reservoir 35. Then, as soon as the pump piston 1 reaches the top dead center position shown, it opens the refill line 39 again with its lower edge, so that any void that may have formed in the pump chamber 4 is immediately compensated for.

Naturally the intermediate piston 5, in the control process described that occurs during the intake stroke, need not necessarily reach the end position against the stop 36 as shown; instead, it may assume some intermediate position—in order to prevent the creation of a void in the pressure chamber 6, for instance—although in each case the feed line 17 must be disconnected from the fill line 28 in this intermediate position, or must be connected to the control line 34 via the annular groove 29. If necessary, the intermediate piston 5 must additionally be loaded by an adjusting spring in the direction of the pump chamber 4, as in the second exemplary embodiment. Since the intermediate piston 5 is intrinsically accelerated upward in the intake stroke, however, and a negative pressure is continuously operative in the pump chamber 4 during the intake stroke, the intermediate piston 5 is moved onward in the intake direction even after the closure of the magnetic valve 19.

Depending on the quantity of fuel metered into the pressure chamber 6 via the magnetic valve 19 during the intake stroke of the pump piston 1, a corresponding fuel quantity is injected in the ensuing compression stroke. Depending on how large the quantity metered into the control chamber 42 during the intake stroke is, the supply onset of the injection varies accordingly, in fact later with an increasing quantity, and vice versa. The larger this quantity, the more fuel must be positively displaced out of the pump chamber 4 into the reservoir chamber 41 at the onset of the compression stroke; and the less fuel has been fed into the control chamber, the shorter is the possible stroke of the reservoir piston 43 during the compression stroke, or the smaller is its displacement volume.

While a control of the injection quantity or control quantity that is dependent on the rotational angle of the drive cam 13 is effected by the pump piston 1 and intermediate piston 5, a purely time-dependent control is provided by the magnetic valve 19. Whenever the magnetic valve 19 opens or closes, the supply of fuel is ended or begun in all cases; in determining the injection quantity, the angular control at the outset and the time control at the end, and in this first exemplary embodiment the quantity to be metered for the supply onset determination, are all controlled solely in terms of time. The angular control then comes into play only in the compression stroke. Naturally, the intermediate piston 5 may be embodied in such a way that a correspondingly longer coincidence exists in the reversal from the fill line 28 to the control line 34, so that the magnetic valve 19 already opens during this time of coincidence, as a result of which the beginning of metering is then effected by means of the intermediate piston control edge, or in other words in an angularly dependent manner.

Figure 2:
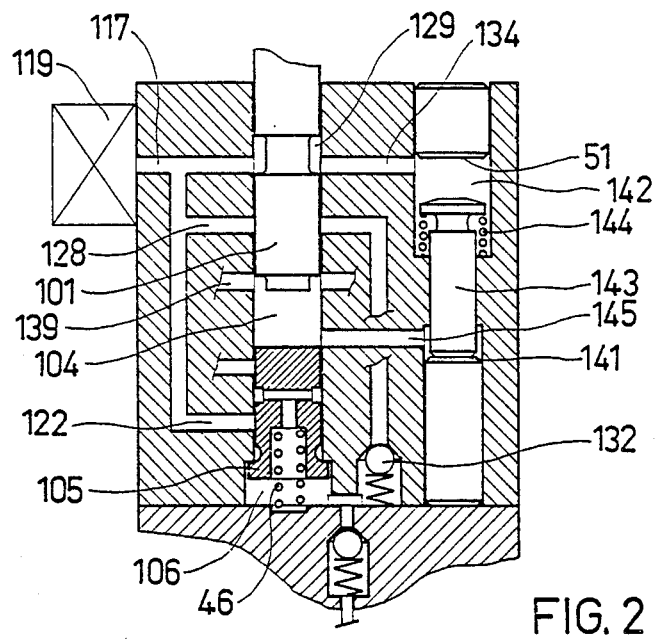
FIGS. 2 and 3 show the second exemplary embodiment as a corresponding detail of a structurally shown unit fuel injector in the intake stroke end position (FIG. 2) and in the compression stroke end position (FIG. 3)
Figure 3:
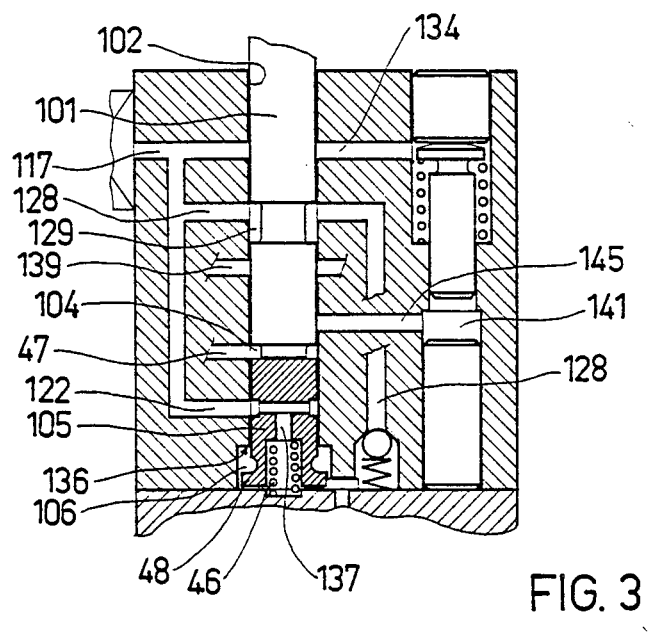

The second exemplary embodiment shown in FIGS. 2 and 3 is shown with more structural detail, although elements unnecessary for comprehension of the invention and already found in the first exemplary embodiment are omitted here. To facilitate comparison of the two exemplary embodiments, the reference numerals for elements corresponding to the first example are merely raised by 100 in the second example. For instance, the pump piston is identified by reference numeral 101 and the intermediate piston by reference numeral 105. In FIG. 2, the pump piston 101 and the intermediate piston 105 each assume the top dead center position, while in FIG. 3 these elements are shown in the bottom dead center position. As in the first exemplary embodiment, the pump piston 101 is driven by a drive cam 13. The basic difference between the two exemplary embodiments is that the fill line 128 and the control line 134 are controlled by the pump piston 101 via an annular groove 129 disposed there, which produces a clear division between angle-dependent and time-dependent control. Also, in this case the intermediate piston 105 is loaded by an adjusting spring 46, and at the end of the compression stroke (FIG. 3), a relief conduit 47 of the pump chamber 104 is opened up by the upper edge of the intermediate piston 105. Since the intermediate piston 105, especially because it is loaded by the adjusting spring 46, form-fittingly follows the pump piston 101 in the intake stroke, this relief conduit 47 is always closed after the same pre-stroke portion of the intake stroke, so that until the opening up of the compensation line 145, the same starting conditions always prevail during the intake stroke. Moreover, this reduces the influence of sources of interference. Serving as an intake stroke stop for the intermediate piston 105 here is a collar 48 of the intermediate piston 105, which cooperates with a corresponding stepped face 136 of the cylinder bore 102. The diversion conduit 122 here has no check means and communicates directly with the feed line 117. The width of the annular groove 129 is also selected such that it is never simultaneously in coincidence with both the fill line 128 and the control line 134.

The function of this second exemplary embodiment, shown in FIGS. 2 and 3, will now be described with the aid of the diagram of FIG. 4. The stroke h of the pump piston is plotted on the ordinate and the rotational angle, in degrees/camshaft (°NW.) of the camshaft 49 of the cam 13, is plotted on the abscissa. While the curve shown represents the strokes of the pump piston 101 at a given rotational angle and thus shows the angle-dependent control, p represents the various control times of the magnetic valve. The diagram also shows the fill conditions for supply onset control, that is, for maximum rpm at top right, and for idling rpm at bottom right.

Figure 4:
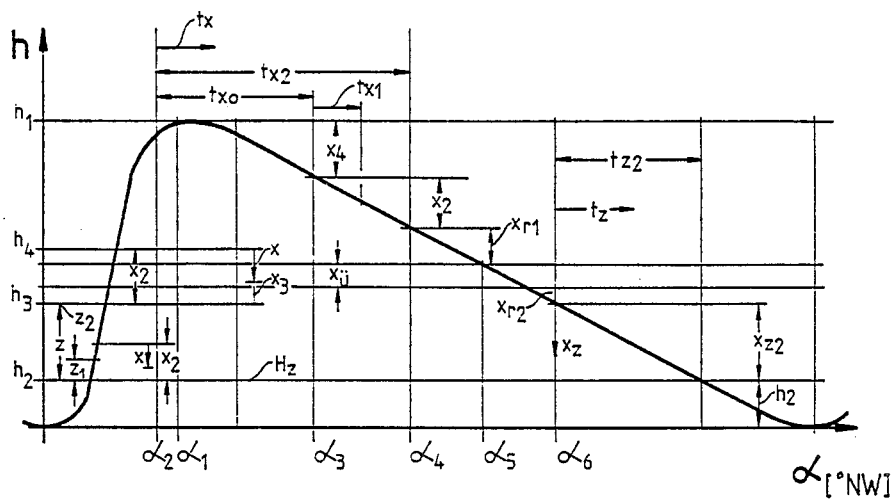
FIG. 4 is a function diagram for the second exemplary embodiment of FIGS. 2 and 3.

The total stroke of the pump piston 101, marked $h_1$ in FIG. 4, is the stroke that the piston travels between the position shown in FIG. 3 and the position shown in FIG. 2. This is equivalent to the reciprocating working stroke of the pump piston 101 between its bottom dead center (UT) and top dead center (OT) determined by the drive cam 13. Beginning at the position in FIG. 2, after a prestroke $h_2$ corresponding to a first segment of the compression stroke edge V of the drive cam 13 shown only in FIG. 1, the refill line 139 is blocked by the pump piston 101, after which the fuel located in the pump chamber 104 and in the reservoir chamber 141 and in the compensation line 145 is trapped. As this compression stroke continues, lasting in this case until 63° NW., fuel is first pumped by the pump piston 101 out of the pump chamber 104 via the compensation line 145 into the reservoir chamber 141. The intermediate piston 104 remains in the outset position shown in FIG. 2 at this time. During this pumping, however, the reservoir piston 143 is displaced upward up to a stop 51, reinforced by the force of the reservoir spring 144. In the outset position in FIG. 2, the reservoir piston 143 executes a maximum stroke in the control position shown. The fuel located in the control chamber 142 at this time is pumped via the control line 134, the annular groove 129 present in the pump piston 101 here acting as a control slide, and a segment of the feed line 117 and through the magnetic valve 119 back to the fuel container, not shown here. The width of the annular groove 129 in cooperation with the correspondingly controlled opening of the control line 134 is selected to be sufficient in each case to keep the control line 134 open during this maximum stroke of the reservoir piston 143.

In each case, the pressure required for displacing the intermediate piston 105 cannot build up in the pump chamber 104 until the reservoir piston 143 rests on the stop 51. The possible displacement volume of the reservoir chamber 141 depends on the particular outset position of the reservoir piston 143. The farther upward it begins its stroke, the shorter is the possible remaining stroke, and so the smaller is the displacement volume. This displacement volume dependent on the outset position of the reservoir piston 143 is represented in the diagram by z with respect to the cam stroke or the stroke of the pump piston 101. Accordingly, this stroke z cannot begin until after the prestroke $h_2$ in any case. The basic line for the stroke z determining the supply onset is thus the line $H_z$, which is parallel to the abscissa in the diagram and has its origin at point $h_2$ on the ordinate h. An intermediate value is represented by $z_1$, and the maximum possible stroke affecting the injection onset is represented by $z_2$. In each case, the annular groove 129 must be selected to be so wide that for this maximum intermediate stroke $z_2$ the control line 134 is opened, to assure an outflow out of the control chamber 142. This is equivalent to a stroke $h_3$ of the pump piston 101 equal to the pre-stroke $h_2$ plus the maximum injection onset stroke $z_2$.

The intermediate piston 105 is not displaced downward counter to the adjusting spring 46 until a relatively high pressure can be established in the pump chamber 104. In this process, first any possible void that as described above is created in the event of incomplete filling of the pressure chamber 106 is compensated for. The stroke effecting the injection accordingly cannot ever begin until the stroke z has ended. For instance, if an extremely early supply onset is sought, so that the reservoir piston 143 already rests on the stop 51 from the outset, then the required pressure is established in the pump chamber 104 immediately after the pre-stroke $h_2$ of the pump piston 101. The farther toward late that the supply onset is shifted, that is, the longer the distance to be covered by the reservoir piston 143 until it meets the stop 51 in the compression stroke of the pump piston 101, the later the corresponding actuation of the intermediate piston 105 begins, so that if there is an extreme shift toward "late", the intermediate piston 105 is not driven until the pump piston 101 has already covered the stroke $h_3$. The stroke of the intermediate piston represented by x, and its maximum stroke by $x_2$. Once the pressure chamber 106 is filled to the maximum, the supply onset can begin at $h_3$, given an extremely late adjustment, and can continue until $h_4$. This stroke segment $x_2$, serving the purpose of the actual fuel supply, shifts farther downward, the earlier the setting of the supply onset, or in other words the shorter the stroke to be covered by the reservoir piston 143 until it meets the stop 51. The supply stroke $x_2$ as the maximum stroke is determined by the opening up of the diversion conduit 122 by the diversion bore 137 in the intermediate piston 105, in other words in the travel of the intermediate piston out of its intake stroke end position until the opening position. The further travel still covered until the end position shown in FIG. 3 for the intermediate piston 105 merely causes a shift of fuel quantities from the pressure chamber 106 into the diversion conduit 122, quantities that have nothing directly to do with quantity control but are merely shifted back and forth. However, in this end position of the intermediate piston 105, its upper edge opens the relief conduit 47, so that as the compression stroke of the pump piston 101 continues, the remaining fuel is pumped out of the pump chamber 104 into the relief conduit 47. In any case, the pump piston 101 assumes the dead center position shown in FIG. 1 only once the total stroke $h_1$ has been covered, or in other words, when the effect on the pump piston 101 of the drive cam 13 changes from the compression stroke edge V to the drop edge III. This point is attained at a rotational angle of $\alpha 1$.

The example shown at $z_2$ and $x_2$ in the diagram is an extreme case, applying to a latest possible supply onset with an extreme injection quantity. Another extreme case, not shown here, is if the supply onset is to take place as early as possible, that is, if the stroke z is omitted and the supply to the engine already begins after the pre-stroke $h_2$ of the pump piston 101, or in other words if the stroke x were to begin already at the line $H_z$. Remaining with the example of an extreme injection quantity $x_2$, this supply to the engine would accordingly begin in a stroke segment between $h_2$ and $h_3$, depending on how long the intermediate stroke z determining the supply onset is. In any case, the diagram shows only the two extreme cases for the earliest early supply onset and the earliest late supply onset, that is, the earliest possible or latest possible actuation of the intermediate piston 105.

During the stroke of the intermediate piston 105 pertaining to the actual injection, that is, the stroke $x_2$ which is always the same, the portion that is equivalent to the effective injection depends on how much fuel is pre-stored ahead of this intermediate piston 105. The other stroke segment is a stroke segment counter to vapor pressure, which always comprises the first portion of the stroke $x_2$. When the maximum injection quantity is being pumped, this vapor pressure portion is omitted. It increases with decreasing injection quantity. Transferred to the diagram, this means that the intermediate strokes $x_2$ shown there, which have a different course depending on the supply onset but are identical, are operative for injection only in the upper or final portion of these strokes. These partial strokes x are thus measured from above, that is, from the line $h_4$, for instance, while the lower portion $x_3$ serves to compensate for the vapor pressure.

In this description of the compression stroke of the pump piston 101, some essential data was omitted for the sake of easier comprehension, such as the coincidence in stroke control and the reserve strokes that are required in quantity control during the intake stroke, but this is described below in detail with reference to the intake stroke. Naturally for an exact set-point injection onset the stroke $x_3$ serving to compensate for vapor pressure must be compensated for by the supply onset control stroke z. This is done with the aid of the electronic control unit 24 (FIG. 1).

The intake stroke of the pump piston 101 begins from the rotational angle $\alpha_1$ on, beginning at the position shown in FIG. 3 and moving to the position shown in FIG. 2, in other words from bottom dead center to top dead center. In this intake stroke, the quantity of fuel to be injected is metered, on the one hand, and the quantity determining the supply onset is metered, on the other. The time-determining control of the magnetic valve 119 is now added to the angle-dependent stroke control of the pump piston 101 and intermediate piston 105.

Already at $\alpha_2$, that is, shortly before the end of the total compression stroke, the magnetic valve 119 opens, so that fuel can flow via the feed line 117 into the fill line 128 and from there via the fill valve 132 into the pressure chamber 106, as soon as the actual intake stroke begins. Since the intermediate piston 105 is loaded by the adjusting spring 46, it directly follows the upwardly oriented intake stroke motion of the pump piston 101, so that fuel can be metered in the space made available by the upward movement. However, before an actual metering can be done, the diversion bore 137 must be disconnected from the diversion conduit 122, because until that is done, fuel flows back into the pressure chamber 106 via the diversion conduit 122. This fuel is the quantity of fuel that is shifted back and forth, as mentioned above, which does not affect control. This is attained at the rotational angle $\alpha_3$. This pre-stroke during the intake stroke is represented by $x_4$. For accurate metering, the instant of closure of the control piston ($\alpha_3$) must naturally be known precisely to the control unit. A speed transducer could be used for this purpose, which evaluates the "jerk" of the control piston upon closure of the diversion bore. The actual fuel metering thus begins only from this instant on, and can continue, at a maximum, no longer than to rotational angle $\alpha_4$, beyond which the intermediate piston 105 rests with its collar 48 on the stop 136. This maximum stroke of the intermediate piston 105 is equivalent to that in the compression stroke and has the length $x_2$. The intake stroke, which the pump piston 101 must travel for a maximum injection quantity, thus comprises the segments $x_4$ and $x_2$. To prevent the pump piston 101 from directly striking the intermediate piston 105 toward the end of the compression stroke, a slight idle stroke of the intermediate piston (margin of safety) is still possible, although it is ignored in this present explanation.

Thus, for the fuel metering into the pressure chamber 106, only the opening duration $t_x$ of the magnetic valve 119 between the rotational angles $\alpha_3$ and $\alpha_4$ is effective. $t_x$ is a function of the rpm and the quantity; the quantity, in the case of cross-sectional control, is the cross-sectional area multiplied by the time.

The opening time of the magnetic valve $t_x$ that is definitive for the metering of the injection quantity can accordingly continue at a maximum up to rotational angle $\alpha_4$ of the camshaft. An effective metering onset, however, occurs only from rotational angle $\alpha_3$ onward. Because the magnetic valve is already opened at 2, that is, prior to $\alpha_1$, all the values affecting the opening of a magnetic valve, such as time lags or other timing errors that are present prior to $\alpha_3$, are eliminated, so that for the effective metering, as a control variable, the angle-dependent value $\alpha_3$ is fed into the control unit. This effective time is represented by $t_{x1}$, while the total time is represented by $t_{x2}$, and the time before the metering begins, in which the magnetic valve is already opened, is represented as $t_{x0}$. The longer $t_{x1}$ is, the larger is the metered injection quantity. Since the control errors, particularly the parasitic oscillations, are controllable more constantly and thus easily with angular controls than with timing controls, with this division of control into angular control and timing control the error rate is halved. Nevertheless, by the addition of the times $t_{x0}$ and $t_{x1}$, the magnetic valve has sufficient switching time available to it, which at a maximum may be $t_{x2}$.

Until the annular groove 129, in the continuation of the intake stroke of the pump piston 101, is disconnected from the fill line 128 and in that process this fill line is blocked by the pump piston 101, the pump piston 101 executes a reserve stroke $r_1$. This reserve stroke $r_1$ is necessary, since with slight control, the controlled cross section of the fill line 128 is reduced beyond a predetermined overlap, which naturally would lead to metering errors if metering were still to be performed in that time segment. This reserve stroke $r_1$ is ended at the rotational angle $\alpha_5$ of the intake stroke. Subsequently, the fill line 128 and the control line 134 are blocked by the pump piston 101, corresponding to the piston stroke $x_{ii}$. Up to the instant of this coincidence, approximately half the drop edge III of the drive cam 13 will have been traveled.

As the intake stroke of the pump piston 101 continues, it completes a further reserve stroke $x_{r2}$, which it needs until the upper control edge of the annular groove 129 has completely opened the control line 134. This is attained from rotational angle $\alpha_6$ onward. Only from this moment on is a control of quantity for the injection onset that is independent of changes in the throttle cross section possible. The reserve strokes $x_{r1}$ and $x_{r2}$ and the coincidence stroke $x_{ii}$ have the purpose not only of attaining a certain control geometry and eliminating the effects of throttling changes but also of decoupling oscillation.

Because of the continuation of the intake stroke of the pump piston 101, a negative pressure arises in the pump chamber 104, even though the intermediate piston 105 is resting on the stop 136 and as a result is mechanically decoupled. In the meantime, the compensation line 145 is opened up again during the intake stroke of the pump piston 101, so that a direct connection exists between the pump chamber 104 and the reservoir chamber 141. Although the negative pressure from the pump chamber 104 is thus transferred into the reservoir chamber 141, the reservoir piston 143, loaded by the reservoir spring 144, remains in its position, in contact with the stop 51.

Beyond rotational angle $\alpha_6$, the magnetic valve 119 opens in order to pump a predetermined quantity at the correct time via the now fully-opened control line 134 into the control chamber 142, and thus to displace the reservoir piston 143 toward the reservoir chamber 141 counter to the reservoir spring reservoir chamber 141 counter to the reservoir spring 144, in the course of which the fuel positively displaced out of the reservoir chamber is pumped into the pump chamber 104, which in any case has a negative pressure or void. Since the diversion conduit 122 and the fill line 128, which likewise branch off from the feed line 117, are blocked by the pump piston 101 or by the intermediate piston 105, the entire quantity metered at the appropriate time by the magnetic valve 119 flows into the control chamber 142. This control time of the magnetic valve is represented by $t_z$, with $t_z$ being a function of the rpm, or also of the load.

The pump piston 101 continues its intake stroke during this quantity control by the magnetic valve 119, until after a stroke segment $x_{z2}$ is covered, the refill line 139 is opened up by the lower edge of the pump piston 101. This happens precisely at the line $H_z$, that is, at the point at which the prestroke $h_2$ of the compression stroke is ended. This segment is equivalent to a maximum available metering time $t_{z2}$ of the magnetic valve 119. This maximum available time is long enough that even at maximum engine rpm the reservoir piston 143 can be displaced into the extreme position shown in FIG. 2. Depending on the actual opening time $t_z$, the reservoir piston 143 can be displaced into the extreme position shown in FIG. 3. Depending on the actual opening time $t_z$, the reservoir piston 143 thus assumes a position between the two extreme positions shown in FIGS. 2 and 3. This is in each case equivalent to a predetermined stroke segment $x_z$ of the pump piston 101.

As soon as the pump piston 101 has opened the refill line 139, fuel at low pressure accordingly flows into the pump chamber 104, to refill it. However, this pressure is so low that it has no effect on the adjusting forces acting on the reservoir piston 143.

Once the pump piston 101 has reached its top dead center position, corresponding to $\alpha=360°$ camshaft angle, the above-described compression stroke cycle begins again. Both the injection quantity and the instant of supply onset are determined by the opening times $t_{x1}$ and $t_z$, respectively.

The significance of the division into angle control and timing control during the intake stroke does not become apparent until the influence of oscillation on the control is also considered. In FIG. 5, the variations of the supply quantity and supply time with a parasitic oscillation superimposed on the piston travel are shown. In this diagram, the control edge control of the pump piston 101 or intermediate piston 105 is compared with the directly acting timing control of the magnetic valve 119. In this diagram, the piston travel s is plotted on the ordinate, above the time t on the abscissa. The main characteristic curve S passing through the origin is the piston travel plus the unit of time, in the fuel feed range. Superimposed on this piston travel are parasitic oscillations of constant amplitude a and constant frequency $f_s = \frac{1}{2} \times T$, these being distinguished from the closing period T of the magnetic valve only by their phase relation. Such parasitic oscillations occur in the cam operation of any injection pump. If the closing period T is small, that is, if these parasitic oscillations are of high frequency, then the amplitude and especially the phase relation are virtually uncontrollable at the engine. However, since as a rule the amplitude decreases with increasing frequency, a quantitative estimate of the effect on the quantity variation is both necessary and possible, as is performed in conjunction with FIG. 5.

The parasitic oscillations in this diagram are represented by X, XI and XII, each shown as a subscript. Thus TX, $T_{XI}$ and $T_{XII}$ respectively designate the supply time in control edge control. The supply time $T_{XII}$ at the same time is equivalent to the set-point supply time, and Q represents the supply quantity in timing control; depending on the parasitic oscillations, the supply quantities are represented as QX, $Q_{XI}$ and $Q_{XII}$, with $Q_{XII}$ being the set-point quantity.

In simplified terms, in control edge control (with supply times T) the injection quantity remains unaffected by the parasitic oscillations defined here. The variation is restricted to the less-critical supply time T.

In magnetic valve control, the situation is precisely the opposite. At an amplitude for instance of of a=+/−0.1 mm, the injection quantity varies between 6.6 mm³ per stroke and 33 mm per stroke as a consequence of a phase relation change based only on T, with T as is well known being in the millisecond range. The critical parasitic frequency $f = \frac{1}{2} \times T$, is $f_s = 500$ Hz, if T=1/1000 of a second. If a constant amplitude of only a=+/−1/1000 mm, then the injection quantity varies between 18.7 mm³ per stroke and 21.3 mm³ per stroke. For an uncontrollable single factor this is still excessive, especially in comparison with the intrinsically time-tested control edge control, which is not subject to this influence, though it has the disadvantage of less open- and closed-loop control flexibility.

Figure 5:
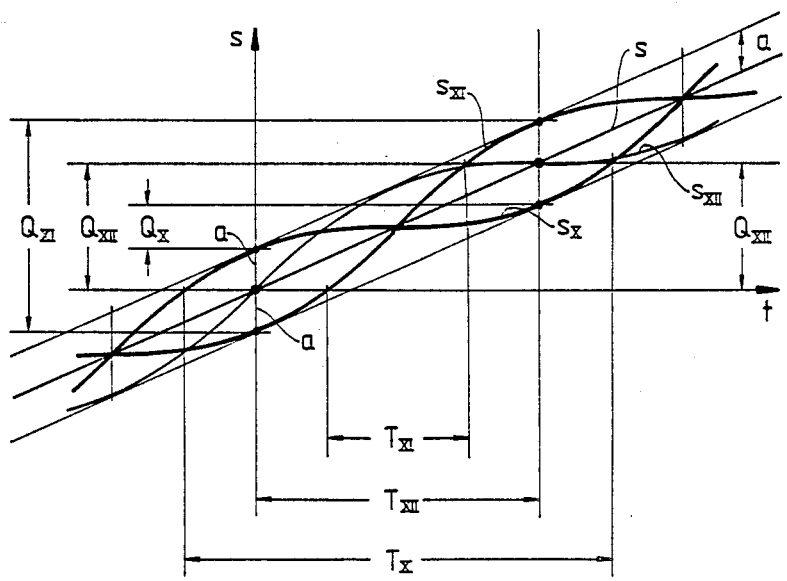
FIG. 5 is a diagram explaining the parasitic oscillations of a unit fuel injector.

As can be seen from the diagram in FIG. 5, the error must be halved if one end of the supply quantity control is controlled with the control edge and the other is controlled with a magnetic valve. In principle, however, the aforementioned system error still remains. By shifting the magnetic valve control to the cam return edge, in both quantity metering and the assignment of the supply onset, the basic disadvantages of magnetic valve timing control are reduced. As stated at the outset, the cam return edge can be made made five to seven times flatter than the compression stroke edge V of the cam 13. As a result, the metering time T becomes five to seven times longer, and the critical parasitic frequency $f_s$ becomes five to seven times lower; in our example, then $f_s = 100$ to 70 Hz, instead of 500 Hz. As a result, the critical parasitic frequency approaches the vicinity of the injection frequency, which predominantly determines the phase relation and amplitude of a nearby parasitic frequency. This lower parasitic frequency tends to be uniform, so that it becomes improbable that any relatively major critical phase relation shifts of T will occur; the term "critical phase relation shift T" is intended to mean the one represented by XII, which is located between the critical parasitic oscillations X and XI.

The foregoing relates to two preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection device for internal combustion engines, comprising a housing, a cylinder bore (2) in said housing a pump piston (1) in said cylinder bore,
    a pump chamber (4) in said cylinder bore related to said pump piston (1) that has a constant working stroke,
    an intermediate piston (5) in said cylinder bore, a pressure chamber (6) in said cylinder bore relative to said intermediate piston,
    said intermediate piston (5) hydraulically separating said pump chamber (4) from said pressure chamber (6),
    a valve needle (11) that controls injection openings (9), a nozzle pressure chamber (8) relative to said valve needle and said injection openings, a pressure line (7) that extends from said pressure chamber (6) to said nozzle pressure chamber (8), a supply onset means for determining an injection onset of fuel for said pressure chamber (6) to said nozzle pressure chamber (8) as a function of a fuel volume containable in said pump chamber (4), for this purpose,
    said pressure chamber (6) functioning to pre-store a fuel volume therein for injection of a required supply quantity, via said nozzle pressure chamber (8), a diversion conduit (22) connected to said pressure chamber (6) and to a fuel supply container,
    said diversion conduit determining an end of supply by opening a one-way valve therein to permit fuel flow from said pressure chamber (6) near an end of a compression stroke due to movement of said intermediate piston (5), wherein said intermediate piston (5) always attains a predetermined end position at an end of a compression stroke,
    a low-pressure fuel source (15), a feed line (17) which can be connected from said low pressure fuel source to a fill line (28) leading to said pressure chamber (6),
    a fill valve (32) connected in said fill line (28), a control valve (19) in said feed line (17) for controlling a flow of a fuel volume into the pressure chamber (6) via said feed line (17) and said fill line (28),
    a reservoir (35) connected with said pump chamber (4) and connectable with said feed line (17) via said cylinder bore,
    said reservoir including a piston (43) separating a reservoir chamber (41) from a control chamber (42),
    a compensation line (45) connected from said pump chamber (4) to said reservoir chamber (41) of said reservoir (35) and a control line (34) which leads from said cylinder bore to said control chamber (42),
    whereby a volumetric capacity of said reservoir (35) is variable in order to determine an enclosable fuel volume in said pump chamber (4) and thus to define a supply onset, and
    that a volumetric capacity of said reservoir is determined by a stroke of said reservoir piston (43) within said reservoir.

2. A fuel injection device as defined by claim 1, in which said control valve (19) in said feed line (17) controls the volumetric capacity of the reservoir chamber (41) for the supply onset.

3. A fuel injector as defined by claim 1, in which fuel flow via said feed line (17) is controllable additionally by means of said intermediate piston driven in synchronism with the pump piston (1).

4. A fuel injector as defined by claim 2, in which fuel flow via said feed line (17) is controllable additionally by means of said intermediate piston driven in synchronism with the pump piston (1).

5. A fuel injector as defined by claim 2, whereby in an intake stroke of the pump piston (1), a control of the fuel volumes into the pressure chamber (6) is effected first, and a control of the volumetric capacity is effected after that.

6. A fuel injector as defined by claim 3, whereby in an intake stroke of the pump piston (1), a control of the fuel volumes into the pressure chamber (6) is effected first, and a control of the volumetric capacity is effected after that.

7. A fuel injector as defined by claim 5, in which said feed line (17) is opened by said control valve (19) and a control slide (101) at the onset of the intake stroke, and after metering of the injection quantity the control valve (19) closes again, after which, during the continuing intake stroke, the control slide disconnects the feed line (17) from the pressure chamber (4) and connects it to said control chamber (42) of said reservoir (35), so that subsequently the control valve (19) opens, and then for the supply onset closes again, in a quantity-determining manner.

8. A fuel injector as defined by claim 6, in which said feel line (17) is opened by said control valve (19) and a control slide (101) at the onset of the intake stroke, and after metering of the injection quantity the control valve (19) closes again, after which, during the continuing intake stroke, the control slide disconnects the feed line (17) from the pressure chamber (4) and connects it to said control chamber (42) of said reservoir (35), so that subsequently the control valve (19) opens, and then for the supply onset closes again, in a quantity-determining manner.

9. A fuel injector as defined by claim 1, which includes stops (51) that determine the end positions of the intermediate piston (5).

10. A fuel injector as defined by claim 2, which includes stops (51) that determine the end positions of the intermediate piston (5).

11. A fuel injector as defined by claim 3, which includes stops (51) that determine the end positions of the intermediate piston (5).

12. A fuel injector as defined by claim 1, which includes a spring (46) that loads said intermediate piston (105), and said spring (46) acts in a direction toward the pump chamber (4).

13. A fuel injector as defined by claim 2, which includes a spring (46) that loads said intermediate piston (105), and said spring (46) acts in a direction toward the pump chamber (4).

14. A fuel injector as defined by claim 3, which includes a spring (46) that loads said intermediate piston (105), and said spring (46) acts in a direction toward the pump chamber (4).

15. A fuel injector as defined by claim 1, in which said pump chamber (4) in the intake stroke end position of the pump piston (1) communicates via a refill line (39) with said fuel source of low pressure.

16. A fuel injector as defined by claim 2, in which said pump chamber (4) in the intake stroke end position of the pump piston (1) communicates via a refill line (39) with said fuel source of low pressure.

17. A fuel injector as defined by claim 3, in which said pump chamber (4) in the intake stroke end position of the pump piston (1) communicates via a refill line (39) with said fuel source of low pressure.

18. A fuel injector as defined by claim 1, in which said reservoir piston (43) operates as a deflection piston, which at a beginning of the compression stroke and on receiving fuel from the pump chamber (4), is deflected by a controllable stroke.

19. A fuel injector as defined by claim 2, in which said reservoir piston (43) operates as a deflection piston, which at a beginning of the compression stroke and on receiving fuel from the pump chamber (4), is deflected by a controllable stroke.

20. A fuel injector as defined by claim 3, in which said reservoir piston (43) operates as a deflection piston, which at a beginning of the compression stroke and on receiving fuel from the pump chamber (4), is deflected by a controllable stroke.

21. A fuel injector as defined by claim 18, in which said reservoir piston (43) is loaded in a deflection direction by a reservoir spring (44), and that on said control chamber (42) side of the reservoir piston (43), said reservoir piston can be acted upon via a control line (34) by fluid pressure that is higher than the pressure prevailing in the pump chamber (4) during the intake stroke and resting phase of the pump piston (1), which via pressure in said control chamber (42), said reservoir piston (43) is displaceable by a distance corresponding to the deflection stroke.

22. A fuel injector as defined by claim 21, in which said control line (34) can be connected by said intermediate piston (5) to the feed line (17).

23. A fuel injector as defined by claim 7, in which a portion of the pump piston (1) serves as the control slide (101).

24. A fuel injector as defined by claim 3, in which a portion of said intermediate piston (5) serves as a control slide.

25. A fuel injector as defined by claim 21, in which said control valve (19) includes a one-way valve (21) embodied in a closed position as a check valve through which a counter current flow is possible, so that during a first phase of a compression stroke of the pump piston (1), fuel from the control chamber of reservoir (35) can be positively displaced back to the fuel source via not only the control line (34) and the feed line (17) but also said control valve (19).

26. A fuel injector as defined by claim 1, in which said control valve (19) is a magnetic valve that is preferably opened when without current and is triggered by an electronic control unit (24), in which engine parameters such as rpm (n), temperature (T) and the like are processed.

27. A fuel injector as defined by claim 1, in which said pump piston (1) is a drive cam (13), which has a long, flatly descending intake stroke segment (intake stroke edge III), a short resting segment (base circle IV), and a steep compression stroke segment (compression stroke edge V).

28. A fuel injector as defined by claim 27, in which a curve of the intake stroke edge follows an Archimedes spiral.

* * * * *